June 16, 1925.

R. L. KINGSLAND 1,542,702

METHOD OF AND APPARATUS FOR CONTROLLING ARC WELDING

Filed Aug. 15, 1921

Witness
H. J. Stromberger.

Inventor
Roger L. Kingsland,
By
Attorney

Patented June 16, 1925.

1,542,702

UNITED STATES PATENT OFFICE.

ROGER L. KINGSLAND, OF FAIRMONT, WEST VIRGINIA.

METHOD OF AND APPARATUS FOR CONTROLLING ARC WELDING.

Application filed August 15, 1921. Serial No. 492,439.

*To all whom it may concern:*

Be it known that I, ROGER L. KINGSLAND, a citizen of the United States of America, residing at Fairmont, in the county of Marion and State of West Virginia, have invented certain new and useful Improvements in Methods of and Apparatus for Controlling Arc Welding, of which the following is a specification.

My invention relates to a means and method for controlling a welding arc in which it is desired to reduce and limit the voltage at the arc below that of the source of supply and to limit the length of which the arc may be drawn.

There are what may be termed a "long arc" and a "short arc" that is the "long arc" maintains sufficient energy to permit the operator to separate the electrode a long distance from the work after the arc is once established before the arc will break. This is true when the electrode is merely in series with a resistance to reduce the current in the arc and connected to a 500 volt source of energy as is the case in using the current from a trolley in welding the rails. A long arc is of a disadvantage in that the arc, laden with conducting particles of carbon, iron or other metals depending on the electrode used, will "waver" or "roam" after the electrode has separated from the work a sufficient distance and the arc not being concentrated and steady, the material of the electrode, when a metallic electrode is used, will not be deposited over a limited area, but it will be found in the form of small bubbles or deposits of metal around the work, and at the same time the metal from the electrode and the work itself may be burned or oxidized.

A "short arc" will not do this as it is limited as to the maximum voltage across the arc and hence is limited as to the distance the electrode may be separated from the work before the arc will break. My invention is for the purpose of limiting such voltage across the arc when the energy for the arc is taken from a relative high voltage source and will limit the length to which the arc may be drawn, and at the same time furnish to the arc the current necessary to give the required heat to the arc.

I have found that the arc between the work and electrode will be concentrated and steady up to an arc length of approximately 5/16" although this value may vary under different conditions and much above that the arc begins to "waver" and finally "roams" from the electrode to any point on the work within such distance as the voltage and condition of the arc can maintain. At the same time I find that the metal from the electrode and of the work is not burned or oxidized. By employing means in conjunction with a current controlling means to limit the length of the welding arc by limiting the voltage thereacross, I am able to prevent the operator from burning or oxidizing the work and metal deposited and from using a "long arc" which prevents the concentration of the arc and hence tends for a cooler arc and prevents "roaming" of the arc thereby permitting the operator to apply the arc to the spot required, all tending for a better weld.

There are various arrangements and schemes for controlling the welding arc, some comprising motor-generators of various designs and characteristics, and which transform the voltage at the source to the required voltage at the arc; others are simply a resistance between the source and the arc which does not control the voltage of the arc but merely cuts down the current delivered to the arc to the proper amount.

The motor-generator scheme or a generator driven by gasoline engine, which is not uncommon, is quite expensive; and the second scheme, merely of a resistance interposed in series between the arc and source of supply, does not give the necessary reduction and limitation in voltage, length of arc and characteristics of the arc unless the source of supply is of proper voltage to begin with.

With my method and apparatus I employ an inexpensive apparatus and reduce the supply voltage and the current from any amount down to the required arc voltage and current and limit the maximum of each to that required to give a predetermined maximum length of arc, assuming that the source of energy is substantially constant. My invention is particularly adapted to the welding of fish plates and rail bonds to rails where it is desired to utilize the current of the trolley which is usually about 250 volts in mines and 500 to 600 volts or higher for electric railways and the low voltage arc is required.

In the figures set forth in the accompanying drawing—

Figure 1:
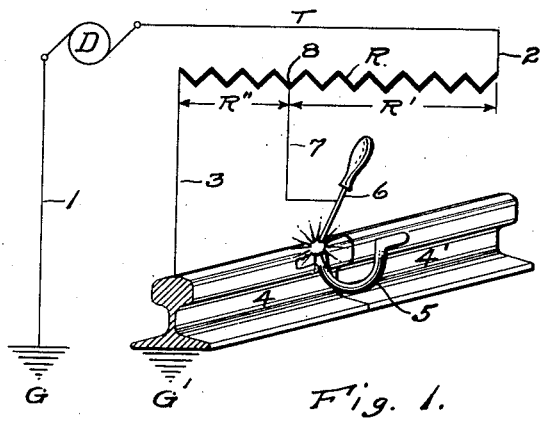
Fig. 1 shows my invention and its application to the welding of a rail bond to a rail when the current is taken from the trolley.

In the disclosure illustrated in Fig. 1, D is a generator having one side connected by the conductor 1 to the ground G and the other side connected to the trolley T. R represents a resistance element placed in series with the trolley T and the rail 4—4' by means of the conductors 2 and 3, and of sufficient capacity to withstand the required welding current without undue heating. The rails 4—4' are connected to the ground by G'. An electrode 6 is connected by the conductor 7 to the resistance R, at the point 8. This point 8 is determined by experiment or by measurement and is so located along the resistance R that the drop in voltage across the resistance R'' will give the desired maximum drop in voltage across the welding arc and hence the desired maximum length of arc. The portion R' of the resistance must carry the current flowing through R'' and the welding arc, when welding; at other times the resistance R' carries only the current flowing through R'' which is equal to the resistance of R divided into the line voltage.

The operation of the system just described is as follows—having adjusted the resistance R' and R'' to the requirements, the operator strikes an arc between the electrode 6 and the work 4. The current flows through R' and divides at 8 and part flows through R'' and the arc. R' is adjusted to give the proper current through the arc and R'' is adjusted to allow the voltage across the arc to reach a predetermined maximum value as the electrode is drawn away from the work before the arc will break, but when the maximum distance and voltage have been reached the arc will break causing the operator to again strike an arc. R'' therefore limits the length of the arc as well as the voltage across the arc as one is a function of the other.

As the electrode contacts with the work it acts as a short circuit to the shunt R'' and most of the current flowing through R' will flow through the circuit 7 and the work, but the instant the electrode is drawn from the work a small amount an arc is produced and maintained, and there is a difference of potential between the electrode and work and the current flow through R'' is greatly increased and likewise greatly reduced through the circuit 7—6 and the arc. As the arc is lengthened the drop across the arc will increase and also the resistance of the arc and the current will become less through the arc and greater through R''. Finally the length of the arc will become so great that the voltage there-across will have approximated the limit set by R'' at which time a still larger portion of the current will be flowing through R'' that was formerly flowing through the arc and hence the heating effect of the arc will be reduced as the heat is the function of the current squared. As the arc length is increased by the operator, the resistance of the arc will increase until its resistance and that of R'' become substantially equal when a very unstable condition will be reached and the current flowing will not be able to sufficiently charge the arc with conducting particles from the electrode to maintain the arc and it will break and all the current will then flow through R' and R''. By setting the maximum voltage across the arc which can be maintained, the maximum length of the arc is set and the operator is compelled to work between the limit of "no arc by contact" and "no arc by excess length" and between these limits the conditions for good welding are established and will be maintained.

A very simple, inexpensive and light arrangement of my invention can be provided in a carrying case which will be capable of reducing the voltage at the arc over a very wide range from that of the source of supply. The shunt R'' around the welding arc controls and regulates the same.

It will be apparent that in Fig. 1 the circuit 1 can be connected to the left hand end of R'' in place of the ground.

Figure 2:
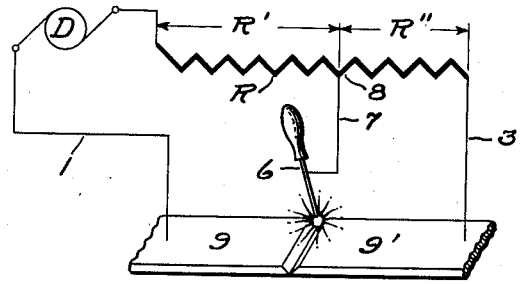
Fig. 2 shows my invention and its application to the welding of two plates (or other articles) in which the current is taken from a generator of higher voltage than the arc voltage.

In Fig. 2 is shown an adaptation of my invention to the welding of other articles than rails or rail bonds and where the circuits are not grounded. In this case the conductor 1 leads to the work 9—9' to be welded which is the only difference from the arrangement shown in Fig. 1.

Figure 3:
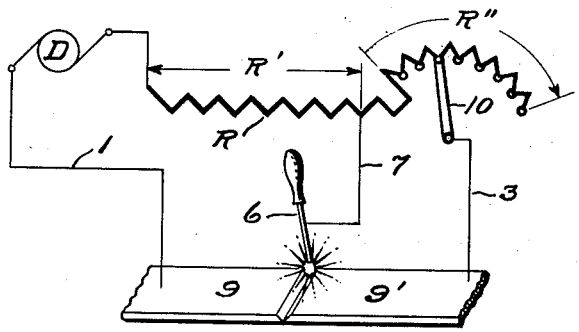
Fig. 3 shows my invention and its application to the welding of two plates (or other articles) in which I employ means for conveniently varying the arc voltage at will.

In Fig. 3 is shown an arrangement embodying my invention in which is shown a variable resistance R″ in place of the fixed resistance R″ in Fig. 2. The resistance R″ of Fig. 3 can also be substituted for the resistance R″ of Fig. 1. By operating the handle 10 in Fig. 3 the resistance R″ is varied and hence the voltage drop across the arc will be varied. The voltage across the arc may be varied in the arrangement shown in Figs. 1 and 2, but not as conveniently as by the arrangement shown in Fig. 3, by connecting the conductor 7 to the resistance R at different points.

The mounting of my invention in a suitable frame or support is not shown as there are many ways of doing this well known at the present time. There are modifications of my invention, other than herein described and shown in the attached drawing and which will be obvious to one skilled in the art and therefore I do not wish to be limited except by the following claims.

I claim:

1. An arc welding system comprising a source of energy, a resistance connected across the source of energy and connections for supplying energy to a welding arc connected to one end of the resistance and to a point intermediate the ends of the resistance, one portion of the resistance limiting the maximum current flowing to the welding arc and the other portion of lower resistance than that of the first portion limiting the maximum voltage across the arc when welding.

2. An arc welding system comprising a source of energy, a resistance connected across the source of energy and connections for supplying energy to a welding arc connected to one end of the resistance and to a point intermediate the ends of the resistance, one portion of less resistance than the other portion forming a shunt across the working arc to cause the arc to break when the drop in voltage across the arc has reached a predetermined maximum amount.

3. An arc welding system comprising a source of energy, a welding arc connected to the source of energy and with a resistance in series to limit the maximum current flowing through the arc and a shunt of lower resistance than that of the first said resistance across the arc to limit the length to which the arc can be drawn when welding.

4. An arc welding system comprising a source of energy, a welding arc connected to the source of energy and with a resistance in series to limit the maximum current flowing through the arc and a variable shunt resistance across the arc to limit the length of the arc to which it can be drawn and to vary the limit at will.

5. An arc welding system comprising a source of energy, a welding arc connected across the source of energy and in series with a resistance to control the amount of current passing through the arc and a shunt resistance across the arc of less resistance than the series resistance to limit the maximum length to which the arc may be drawn while welding.

6. An arc welding system comprising a source of energy, a welding arc connected across the source of energy, a resistance in series with the arc and the source of energy to limit the maximum current through the arc and a resistance element of lower resistance than that of the series resistance connected across the arc to limit the maximum length to which the arc may be drawn.

7. The combination with a welding arc, of a source of substantially constant potential for supplying current to said arc, a single resistance in series with said source, and means for connecting said arc in parallel with a portion only of said resistance to provide a limited voltage on said arc, the resistance in parallel with said arc being independent of the current flowing in said arc.

8. The combination with a welding arc, of a source of substantially constant potential for supplying current to said arc, a resistance in series with said source, means for connecting said arc in parallel with a portion only of said resistance of value less than half the total value of said resistance to provide a limited voltage impressed on said source, the amount of resistance in parallel with said arc being independent of the current flowing in said arc.

9. In arc welding apparatus, the combination of a source of substantially constant potential materially greater than that required for arc welding, a resistance in series with said source, a welding arc, means for connecting said arc in parallel with a portion only of said resistance of a value less than half the total value of said resistance to produce a limited voltage on said arc and thus limit the length thereof, said connecting means maintaining the value of said resistance in parallel with said arc at less than half the total value of said series resistance during welding operation.

10. In combination with a welding arc, a source of substantially constant potential of greater value than that required to operate said arc, resistance in series with said source, means for connecting said arc in parallel with a portion of said resistance to give a limited potential drop across said arc to limit the length of said arc, said connecting means maintaining a constant resistance value in parallel with said arc at all times while the electrodes of said arc are separated from one another.

11. In combination, a source of substantially constant potential, a resistance in series with said source, a welding arc, resistance in series with said first named resistance, and means for connecting said welding arc in parallel with said second named resistance, said connecting means including means for varying the length of said arc while permitting the resistance in parallel with said arc to remain substantially unchanged even when said arc is broken, thus limiting the voltage on said arc and consequently the length thereof.

In testimony whereof I affix my signature.

ROGER L. KINGSLAND.